June 6, 1939.  O. HACKER  2,161,760

AUTOMOBILE VEHICLE

Filed Jan. 15, 1936  4 Sheets-Sheet 1

INVENTOR
OSKAR HACKER
BY
ATTORNEY

June 6, 1939.  O. HACKER  2,161,760
AUTOMOBILE VEHICLE
Filed Jan. 15, 1936  4 Sheets-Sheet 2
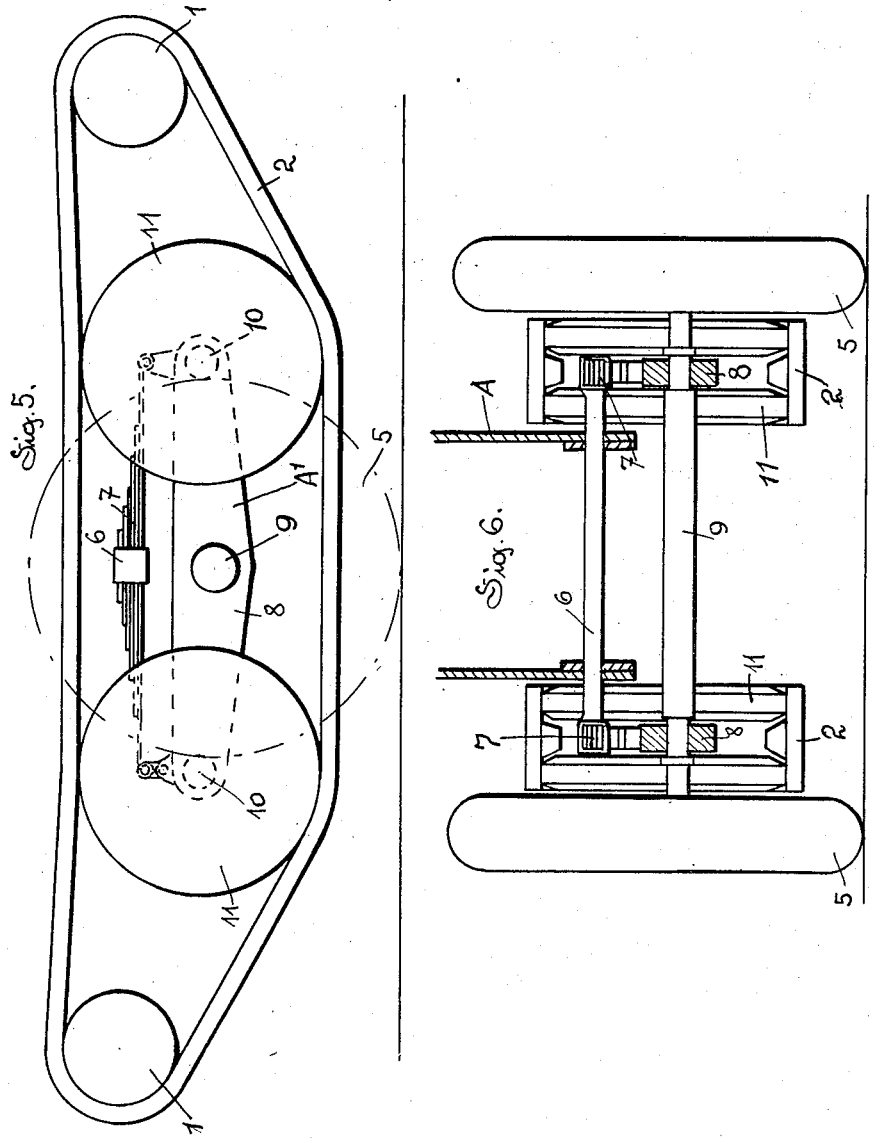
INVENTOR
OSKAR HACKER
BY
ATTORNEY

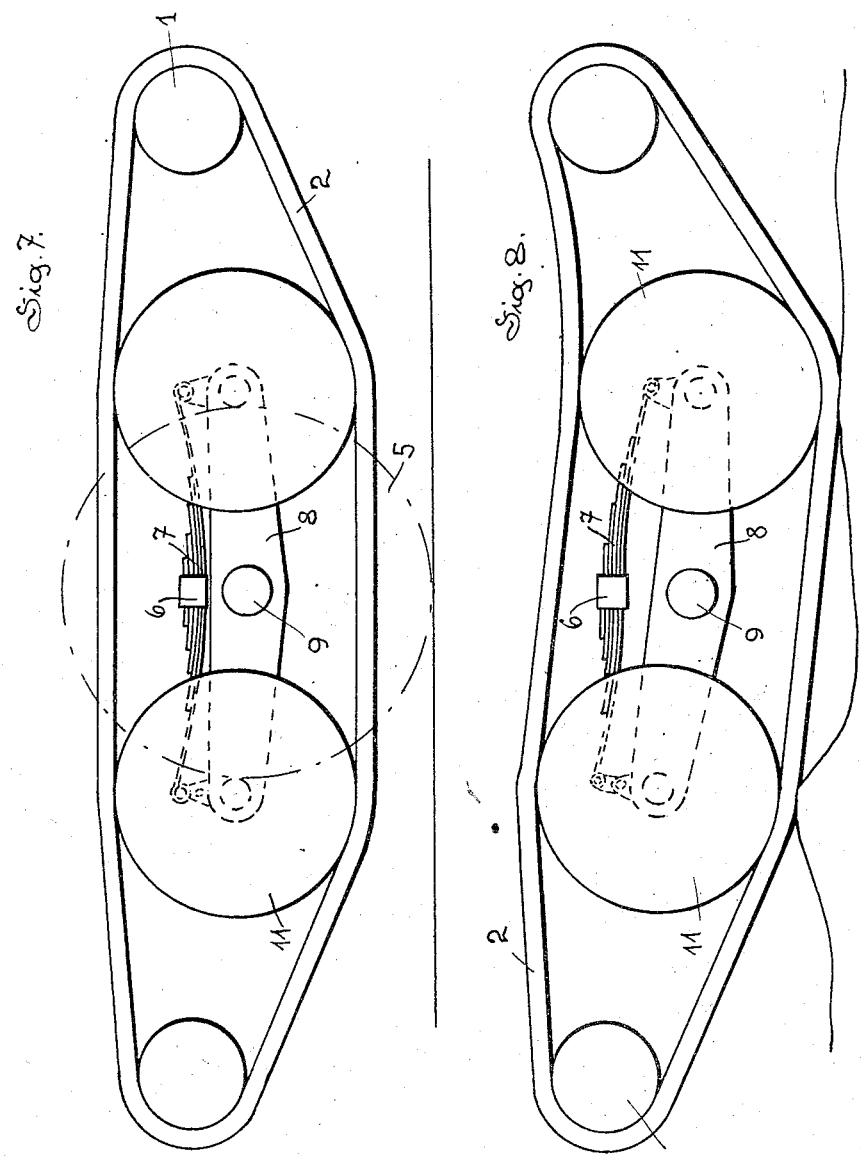

June 6, 1939.  O. HACKER  2,161,760
AUTOMOBILE VEHICLE
Filed Jan. 15, 1936   4 Sheets-Sheet 4
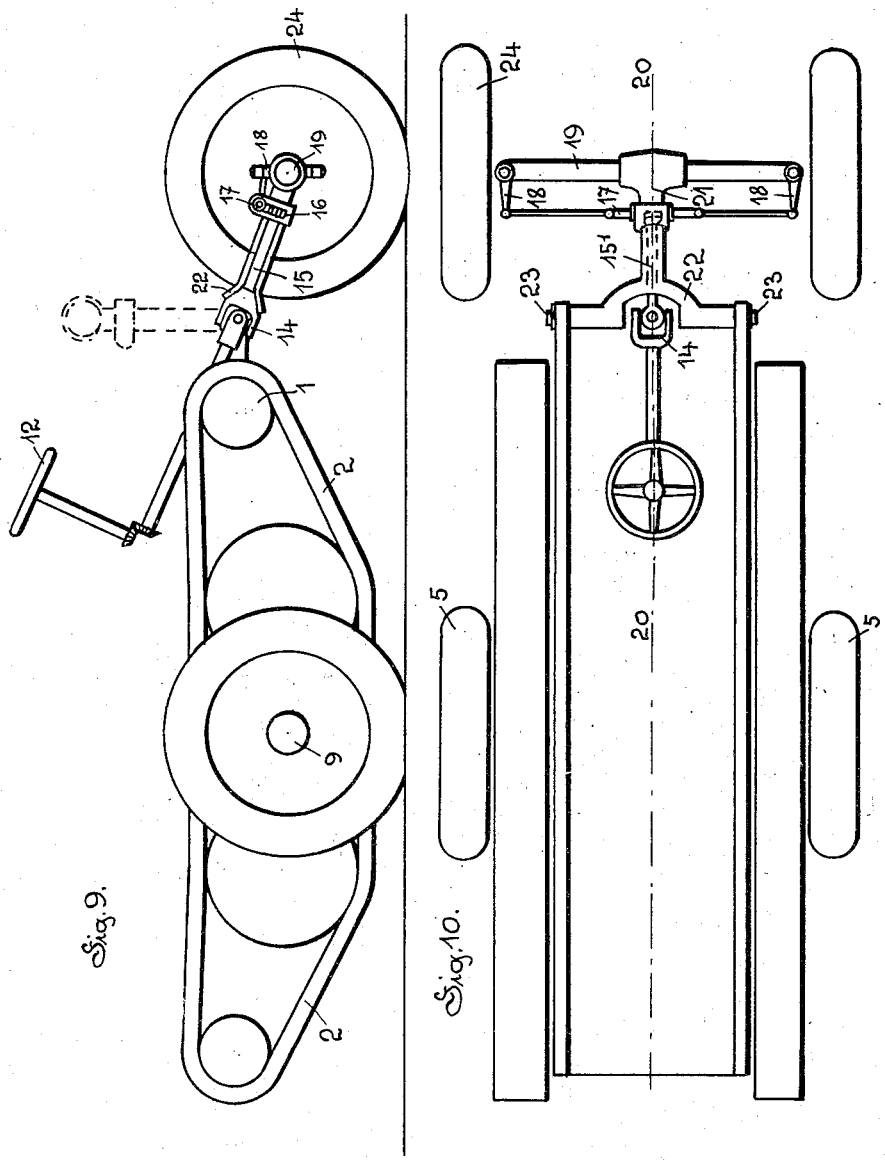
INVENTOR
OSKAR HACKER
BY
ATTORNEY Patented June 6, 1939

2,161,760

UNITED STATES PATENT OFFICE 2,161,760

AUTOMOBILE VEHICLE

Oskar Hacker, Steyr, Austria, assignor to Steyr-Daimler-Puch A. G., Steyr, Austria Application January 15, 1936, Serial No. 59,174
In Austria February 4, 1935

5 Claims. (Cl. 180—9.1)

This invention relates to automobile vehicles, more particularly tractors, which can be operated both as endless-track vehicles and as wheeled vehicles.

It is known to combine wheeled vehicles with endless tracks or endless-track vehicles with wheels in such a way that optional driving is possible either upon wheels or upon endless tracks, the endless tracks being raised by means of a crank relatively to the wheels, or the wheels being similarly raised relatively to the endless tracks, for the purpose of putting one of these mechanisms out of operation. Vehicles are also known which run on wheels in the front and on endless tracks at the back. All these known structures have disadvantages, residing in the complicated structure of the lifting or changing mechanisms required, and also in the fact that each of the two mechanisms hampers the other, and more particularly still in the excessive breadth of such vehicles.

Now the object of the present invention is to provide a vehicle which is free from the aforementioned disadvantages, and which can be applied to a variety of purposes with great simplicity and reliability of operation.

According to the invention, the vehicle consists of two parts, namely, a part comprising endless tracks carried by a main frame together with at least one axle with removable road wheels supported by this frame, and a part comprising an auxiliary or wheeled frame with detachable road wheels, this auxiliary frame being so pivotally connected to one end of the said main frame that it is capable of adjustment substantially to an upright and to a horizontal position and to positions therebetween. With this arrangement the vehicle can travel either as a wheeled vehicle with at least two axles upon the road wheels of both portions, or upon the endless track of the one portion and the wheels of the other portion, or upon the endless track alone with the auxiliary frame raised, or, finally, upon the endless track along with the road wheels removed. Furthermore, since the auxiliary frame in the horizontal position allows for the formation of a longer vehicle and in the upright position for the formation of a shorter vehicle, a result is achieved in the latter case, particularly when the wheels are removed, of eliminating the disadvantage of great length, which is so considerable with the known structures, and a vehicle is obtained which is so short that it can be turned where it stands, even in a wood, or can negotiate sharp corners in sunken roads, lanes, and gulleys without difficulty.

The preferred form of construction has an endless-track main frame in which the road wheels are mounted upon an axle of their own, which is independent of the endless track wheels.

The vehicle either has no drive of its own or is provided with a driving motor.

In one advantageous form of construction of the invention the arrangement is such that for operating on wheels and operating on endless tracks different running mechanisms are provided, but the springs for the endless-track mechanism and for the wheel mechanism are suitably combined. It is well known to spring the running rollers of endless-track mechanism of such combination vehicles individually or in groups by means of spiral or laminated springs, and also by means of individual so-called roller carriages, separate spring means then being required for the wheeled structure. In the vehicle according to this invention only a single spring is employed on each side of the vehicle, for instance a laminated spring, both for the springing of the road wheel and for that of the pair of endless-track rollers, this spring serving for supporting the weight of the vehicle and for taking up the shocks, when travelling on wheels or endless tracks upon smooth ground, but also being capable, when travelling on endless tracks on uneven ground, of enabling the individual endless-track roller to execute the individual spring movement which is independent of the springing as a whole or supplementary to the latter, and which is necessary for negotiating obstructions beneath the endless-track chain. A form of construction is preferred which has longitudinally arranged laminated springs, which are secured upon suitable supporting members (transverse carriers or the like), while the ends of the springs are supported upon a longitudinally extending carrying beam arranged thereunder, in the centre of which is arranged the support for the driving axle of the wheels, and at the ends of which are arranged the supports for the carrying rollers of the endless track.

One form of construction of the invention is diagrammatically illustrated by way of example in the accompanying drawings.

In the constructional example illustrated in the drawings, the vehicle consists of an endless-track underframe and a wheeled underframe with one axle, arranged at the rear having regard to the direction of travel, and adjustable in height, preferably by being rockably supported, this wheeled underframe having steering wheels, and the endless-track underframe being equipped with road wheels capable of being slipped on and removed, which form the front wheels of the vehicle, whereas the wheels of the wheeled underframe are rear steering wheels, and are also preferably removable.

Figures 5 to 7 show the vehicle on a larger scale when travelling upon smooth ground, while Figure 8 shows it traveling over an obstacle.

Figures 9 and 10 show the vehicle in elevation and in plan, respectively, in the same position as Figure 4, with the requisite details for illustrating the steering.

Figure 1:
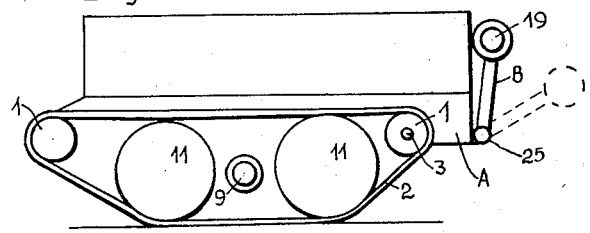
Figure 1 represents quite diagrammatically the vehicle when travelling exclusively upon endless tracks, with the auxiliary frame raised, all the road wheels being removed, that is, not only the road wheels of the endless-track substructure but also the road wheels of the auxiliary frame.
Figure 2:
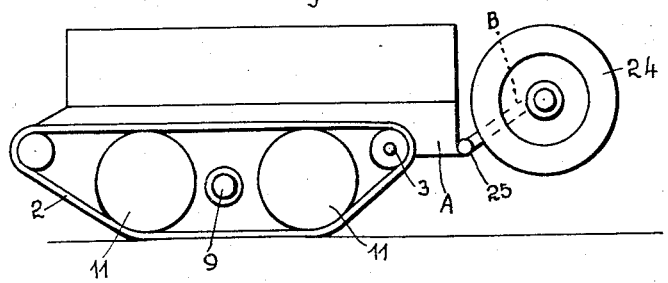
Figure 2 shows the vehicle when travelling upon endless tracks with the front road wheels removed and with the auxiliary frame raised so high that its wheels do not revolve, but can serve as supporting rollers if the vehicle tends to rear on steep tracks.
Figure 3:
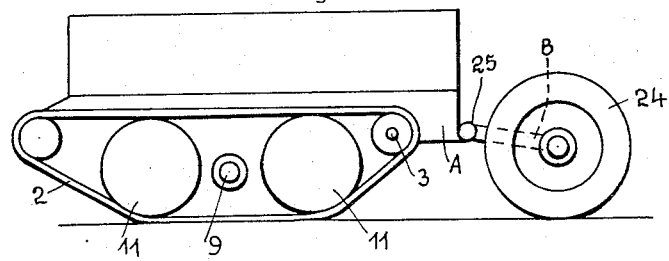
Figure 3 shows the vehicle with the front wheels removed, travelling upon the endless tracks and the rear wheels of the auxiliary frame, a travelling position which is advantageous for the purpose of obviating excessive lurching when travelling at a high speed upon undulating ground.
Figure 4:
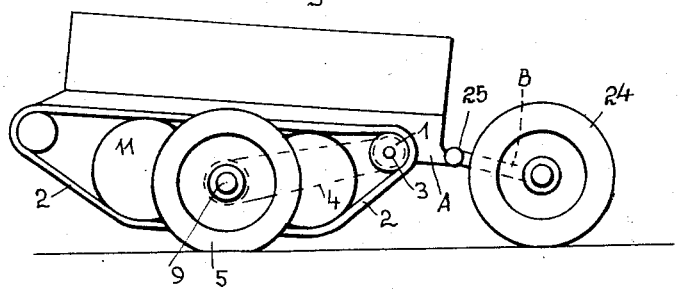
Figure 4 shows the position for travelling upon wheels only.

In Figs. 1 to 5, A denotes the frame of the vehicle and A' a substructure which is sprung relatively to the frame, and which will be described hereinafter. The parts A and A' constitute the main frame of the vehicle. An auxiliary frame B is pivotally connected to one end of the main frame as indicated at 25 so that it can be swung upwards and backwards. The frame A carries the driving rollers 1 for the endless tracks 2, while the substructure A' carries the endless-track supporting rollers 11 and a wheel axle 9 on which road wheels 5 (Fig. 4), preferably furnished with pneumatic tyres, are detachably fitted. The auxiliary or wheeled frame B is likewise fitted with detachable road wheels 24. A transverse driving shaft 3 is provided by means of which the power from a driving motor (not shown) is transmitted, selectively, to the driving rollers 1 of the endless tracks 2, or, through the intermediary of a driving chain 4 (Fig. 4) to the axle 9 of the road wheels 5.

As will be seen from the drawings, when the auxiliary frame B is swung back to its rearmost position, in which it is horizontally disposed (Figs. 3 and 4) the over-all length of the vehicle is increased, while when this auxiliary frame is in a substantially upright position (see the full lines in Fig. 1) the length of the vehicle is considerably decreased, more particularly when the road wheels 24 are removed. The above described important advantages are obtained as a result of this arrangement.

The device is such that the axles and hubs of all the wheels, but particularly of the wheels beside the endless tracks, are so constructed that after removal of the wheels no portion of the wheel structure projects sideways beyond the endless-track chain.

The weight of the vehicle is transmitted by a transversely arranged cross beam 6 mounted on the frame A, shown in Figures 5 and 6, to longitudinally extending laminated springs 7, which are supported with their ends upon a bearing beam 8 in the substructure A', in which the driving axle for the driven road wheels 5 and the supporting rollers 11 of the endless tracks are supported. The road wheels 5 are non-stearable.

As will be seen from Figures 5 to 8, the spring, when the vehicle is traveling on wheels, transmits the weight of the vehicle resting upon the spring cross beam 6 to the longitudinal carrying beam or scale beam 8, which carries the endless-track rollers 11 and the wheel axle 9. The weight is transmitted by the ends of the springs through the longitudinal scale beam 8 to the wheel axle 9 journalled in the centre thereof, and from the latter to the two rubber-tyred road wheels 5. This arrangement differs from the usual carriage spring arrangements by the fact that the centre of the spring, instead of being secured upon the car axle, is secured to the car frame, and the ends of the spring, instead of resting upon the car frame, rest upon the longitudinally extending axle scale beam.

When the travelling with endless tracks upon level ground the carriage spring acts in the same way as when travelling upon wheels, except that the weight of the vehicle is transmitted by the transverse bearing beam to the spring, and from this to the longitudinal bearing beam, and by the latter to the two endless-track chain-carrying rollers. The longitudinal carrying beam is therefore loaded in the centre when travelling on wheels, but at the ends when traveling on endless tracks. Now if the vehicle, on endless tracks, runs over an obstacle in the form of a hump, the leading endless-track roller, under the influence of the back pressure of this obstacle, will move upwards in order to avoid the obstacle. This movement is possible because the longitudinal spring yields with an S-shaped curvature, and the roller-carrying beam assumes a correspondingly oblique position.

The normal deflection of the spring 7 in relation to the carrying beam 6 when travelling upon level ground is shown by Figure 7. Figure 8 illustrates how the front endless-track roller is raised, the spring 7 is given an S-shaped bend and the carrying beam 8 is likewise raised, by riding over an obstruction.

The spring may even be rotatably suspended upon the transverse carrying beam, thus yielding particularly ready flexibility of the carrying beam and of the rollers. Those arrangements in which the spring is secured upon the transverse carrying beam rigidly, that is, non-rotatably, have the advantage that the vehicle remains stable even when it is running only upon the endless tracks, without the rear supporting wheels, although with a view to smallness and shortness of the vehicle only two endless-track rollers are provided at each side.

When travelling on wheels, the steering of the vehicle is effected by means of a steering hand wheel 12, which, through the medium of bevel gearing 13 on a shaft 15, a cardan joint 14 at the end of shaft 15, and a shaft 15', connected to the joint 14 actuates a toothed wheel 16, which moves a transverse coupling rod 17, and thereby adjusts the steering swivels 18.

When travelling on the endless tracks, the vehicle is steered by the difference of speed of the endless tracks on either side.

According to the invention the arrangement for the raising or rocking up of the wheel axle 19 is such that movability of the steering mechanism for the steering-road wheels 24, and in fact for the entire steering system, remains unaffected.

This may for example be obtained by the steering hand wheel 12 driving through the medium of a bevel or like gear 13 fixed to a shaft 15 extending rearwards of the steering wheel post in the middle of the vehicle, which shaft, at its point of intersection with that geometrical axis 23—23 about which the rear wheel axle is rocked up, carries a cardan joint 14, which transmits the rotary movement of the longitudinal steering shaft 15 driven by the bevel wheels 13 or the like to another shaft 15' without any obstruction even in a bent condition with the rear wheels 24 rocked up. By this arrangement any spring play of the rear axle 19 remains without influence upon the transmission of the steering forces from the steering-hand wheel 12 to the axle swivels 18.

The rear axle 19 of the auxiliary frame B, which can be raised and secured in the raised position, is provided in the centre with a pivot 21, which is journalled in a forked member 22, so that it can swing about the longitudinal axis 20—20 of the vehicle. Since the forked piece 22 can swing about the transverse axis 23—23 on the vehicle, the rear axle 19 can be rocked up, with the rear wheels 24, which may be equipped with pneumatic tyres. The movability of the steering mechanism remains unimpaired, because the centre point of the cardan joint 14 is located in the axis 23—23.

By means of a conventional form of disengageable clutch the drive which is common to the wheels 5 and the endless tracks 2 can be applied as required either to the endless-track chain-driving rollers or to the driving elements of the wheeled units, but the device may be such that at least the endless-track mechanism can be disconnected from the drive when travelling on wheels.

The driving arrangement may be such that the drive is transmitted from the engine through an ordinary change-speed gear to a transverse shaft, which carries both the driving rollers for the endless-track chain and the driving element for the wheels.

What I claim is:

1. A vehicle of the kind described comprising a main frame, an endless track carried thereby, an axle supported by said frame, removable road wheels on said axle, an auxiliary frame pivotally connected to one end of said main frame and forming an extension of said main frame, steerable road wheels supported by said auxiliary frame, steering mechanism and means for imparting the movements of said steering mechanism to said steerable wheels in any position of the auxiliary frame, said means including a steering shaft and a cardan joint in the steering shaft at its point of intersection with the axis of connection of said auxiliary frame to said main underframe.

2. A combined endless-track and wheeled vehicle having a main frame supporting an endless track, an axle supported by said frame, removable road wheels on said axle, an auxiliary frame connected to said main frame and forming an extension thereof, wheels supported by said auxiliary frame, said auxiliary frame being adjustable in height, steering mechanism for the vehicle, said mechanism including a steering shaft, a toothed wheel connected to the end of said shaft, a cardan joint formed in said shaft between its ends, a transverse coupling rod operatively connected to the toothed wheel and swivel members connected to the rod and axle for the wheels.

3. A vehicle of the kind described comprising a main frame, axles mounted on said frame, rollers carried thereby, an endless track supported by said rollers, a motor driven drive shaft, a driven axle operatively connected to said shaft, non-steerable wheels removably mounted on said latter axle, a cross beam secured to said frame, longitudinally arranged laminated springs secured to said cross beam at its center and longitudinally arranged carrying beams secured to the ends of said springs, said beams supporting the axle for the wheels and the axles for the rollers.

4. A vehicle of the kind described comprising a frame, a substructure sprung relatively to said frame, axles mounted at the ends of said substructure, rollers carried thereby, an endless track supported by said rollers, another axle mounted on said substructure, detachable road wheels on said latter axle, an auxiliary frame pivotally connected to one end of said main frame so that it may occupy either a horizontal or a vertical position, detachable road wheels on said auxiliary frame, the vehicle being lengthened when said auxiliary frame is in horizontal position and substantially unchanged in length when said auxiliary frame is in vertical position.

5. A vehicle of the kind described, comprising a frame, a substructure sprung relatively to said frame, axles mounted on said substructure, rollers carried thereby, an endless track supported by said rollers, a motor-driven driving shaft, a driven axle on said substructure operatively connected with said shaft, non-steerable road wheels on said driven axle, an auxiliary frame pivotally connected to one end of said main frame so that it is capable of being swung from a vehicle-lengthening horizontal position to a vehicle-shortening substantially upright position, and detachable road wheels on said auxiliary frame.

OSKAR HACKER.